(12) United States Patent
Iwahashi et al.

(10) Patent No.: US 8,142,904 B2
(45) Date of Patent: Mar. 27, 2012

(54) COPPER BASED SINTERED SLIDE MEMBER

(75) Inventors: Shoichiro Iwahashi, Fujisawa (JP); Kazuo Kato, Fujisawa (JP); Takehiro Shirosaki, Fujisawa (JP); Takashi Kikkawa, Fujisawa (JP)

(73) Assignee: Oiles Corporation, Tokyo (JP)

( * ) Notice: Subject to any disclaimer, the term of this patent is extended or adjusted under 35 U.S.C. 154(b) by 177 days.

(21) Appl. No.: 12/160,827

(22) PCT Filed: Jan. 15, 2007

(86) PCT No.: PCT/JP2007/000012
§ 371 (c)(1),
(2), (4) Date: Jan. 21, 2010

(87) PCT Pub. No.: WO2007/080824
PCT Pub. Date: Jul. 19, 2007

(65) Prior Publication Data
US 2010/0279139 A1    Nov. 4, 2010

(30) Foreign Application Priority Data

Jan. 16, 2006    (JP) .................................. 2006-007315

(51) Int. Cl.
*C22C 9/00* (2006.01)
*C22C 9/02* (2006.01)
*C22C 9/05* (2006.01)
*B32B 15/20* (2006.01)

(52) U.S. Cl. ............. 428/564; 428/674; 75/231; 75/247

(58) Field of Classification Search ........................ None
See application file for complete search history.

(56) References Cited

U.S. PATENT DOCUMENTS 5,114,468 A * 5/1992 Akutsu et al. ................... 75/234
5,326,384 A * 7/1994 Asada et al. ..................... 75/231
2004/0149083 A1 * 8/2004 Takayama et al. .............. 75/232

FOREIGN PATENT DOCUMENTS

| JP | 58-147536 | | 9/1983 |
| JP | 63-176819 | | 7/1988 |
| JP | 02-107729 | | 4/1990 |
| JP | 03-232905 | * | 10/1991 |
| JP | 04-099834 | * | 3/1992 |
| JP | 4-110430 | | 4/1992 |
| JP | 2001-240925 | * | 9/2001 |

OTHER PUBLICATIONS

Supplementary European Search Report dated Sep. 7, 2010 in EP 07 70 6264.
International Search Report for PCT/JP2007/000012, mailed Apr. 17, 2007.

* cited by examiner

*Primary Examiner* — Jennifer McNeil
*Assistant Examiner* — Jason Savage
(74) *Attorney, Agent, or Firm* — Nixon & Vanderhye P.C.

(57) ABSTRACT

The present invention relates to a copper-based sintered slide member comprising 0.5 to 20% by weight of tin, 0.1 to 35% by weight of manganese, 2 to 25% by weight of a solid lubricant and the balance essentially consisting of copper; and a multilayer copper-based sintered slide member comprising a copper-based alloy sintered layer and a metal backing plate which are formed into an integral multilayer structure, wherein the copper-based alloy sintered layer comprises 0.5 to 20% by weight of tin, 0.1 to 35% by weight of manganese, 2 to 25% by weight of a solid lubricant and the balance essentially consisting of copper. The above slide members are in the form of a lead-free copper-based sintered slide member. The copper-based sintered slide member can exhibit sliding characteristics similar to or higher than those of lead-containing copper-based sintered slide members and can be suitably used as an oil-containing sintered slide member, and can also be suitably used even under conditions in high-temperature ranges and/or under dry frictional conditions in which it may be difficult to use a lubrication oil, and a multilayer sintered slide member capable of exhibiting excellent sliding characteristics even under high-load conditions.

6 Claims, No Drawings

COPPER BASED SINTERED SLIDE MEMBER

This application is the U.S. national phase of International Application No. PCT/JP2007/000012, filed 15 Jan. 2007, which designated the U.S. and claims priority to Japan Application No. 2006-007315, filed 16 Jan. 2006, the entire contents of each of which are hereby incorporated by reference.

TECHNICAL FIELD

The present invention relates to a copper-based sintered slide member, and more particularly, to a copper-based sintered slide member containing a solid lubricant dispersed therein as well as a multi-layer copper-based sintered slide member.

BACKGROUND ART

As copper-based sintered slide members (bearings), there are known Cu—Sn-solid lubricant-based sintered slide members containing a solid lubricant such as graphite and lead. Also, in order to improve the load carrying capacity thereof, there are known multi-layer sintered slide members constructed of a metal backing plate such as a steel plate and a sintered layer made of the above sintered material which is integrally formed on the surface of the metal backing plate. For example, there has been proposed the multi-layer copper-based sintered slide member having an integral multilayer structure constructed from a copper-based alloy sintered layer and a steel-based metal backing plate in which the copper-based alloy sintered layer is composed of 1 to 11% by weight of tin, 1 to 30% by weight of lead, 0.5 to 5% by weight of spherical carbon and the balance essentially consisting of copper (Patent Document 1).

Lead as a solid lubricant is an important component of the conventional copper-based sintered slide members as a material capable of allowing the slide members to exhibit an excellent conformability with a counterpart member when subjected to sliding motion thereon, and enhancing an anti-seizing property thereof. However, in recent years, the use of lead must be avoided from the viewpoints of environmental problems, etc.

Patent Document 1: Japanese Patent Application Laid-Open (KOKAI) No. 7-138681

DISCLOSURE OF THE INVENTION

Problem to be Solved by the Invention

The present invention has been made in view of the above conventional problems. An object of the present invention is to provide a lead-free copper-based sintered slide member which can exhibits sliding characteristics similar to or higher than those of lead-containing copper-based sintered slide members and can be suitably used as an oil-containing sintered slide member, and further suitably used even in high-temperature ranges or under dry frictional conditions in which it may be difficult to use a lubrication oil. In addition, another object of the present invention is to provide a multilayer sintered slide member capable of exhibiting excellent sliding characteristics even under high-load conditions.

Means for Solving Problem

As a result of the present inventors' earnest study, it has been found that when specific amounts of manganese (Mn) and a solid lubricant are incorporated into a Cu—Sn matrix, the obtained slide member can exhibits sliding characteristics similar to or higher than those of lead-containing copper-based sintered slide members and can be suitably used as an oil-containing sintered slide member.

The present invention has been attained on the basis of the above finding. That is, in a first aspect of the present invention, there is provided a copper-based sintered slide member which comprises 0.5 to 20% by weight of tin, 0.1 to 35% by weight of manganese, 2 to 25% by weight of a solid lubricant and the balance essentially consisting of copper.

Also, in a second aspect of the present invention, there is provided a multilayer copper-based sintered slide member comprising a copper-based alloy sintered layer and a metal backing plate which are formed into an integral multilayer structure, wherein the copper-based alloy sintered layer comprises 0.5 to 20% by weight of tin, 0.1 to 35% by weight of manganese, 2 to 25% by weight of a solid lubricant and the balance essentially consisting of copper.

Effect of the Invention

In accordance with the present invention, there can be provided a copper-based sintered slide member which can exhibit sliding characteristics similar to or higher than those of lead-containing copper-based sintered slide members and can be suitably used as an oil-containing sintered slide member, and further which can exhibit excellent sliding characteristics even when used not only under dry frictional conditions and/or under conditions in high-temperature ranges in which it may be difficult to use a lubrication oil, but also under high-load conditions.

PREFERRED EMBODIMENTS FOR CARRYING OUT THE INVENTION

The present invention is described in detail below. First, the copper-based sintered slide member is described. The copper-based sintered slide member of the present invention is composed of 0.5 to 20% by weight of tin, 0.1 to 35% by weight of manganese, 2 to 25% by weight of a solid lubricant and the balance essentially consisting of copper.

Tin (Sn) is alloyed with copper (Cu) as a main component to form a Cu—Sn alloy (bronze). Sn serves for reinforcing a solid solution of a Cu—Sn alloy matrix to enhance mechanical properties thereof such as strength and hardness and further improve a load carrying capacity, an wear resistance and an anti-seizing property of the resultant sintered slide member. The content of Sn in the sintered slide member is 0.5 to 20% by weight and preferably 5 to 20% by weight. When the content of Sn is less than 0.5% by weight, the effect of reinforcing the Cu—Sn alloy matrix tends to be lowered. When the content of Sn is more than 20% by weight, the Cu—Sn alloy matrix tends to become brittle.

A whole amount of manganese (Mn) is used for forming a solid solution with Cu as the main component. Mn mainly contributes to reinforcement of the solid solution of the Cu—Sn alloy matrix, and can exhibit such an effect of enhancing a mechanical strength and an wear resistance thereof. For example, when the content of Mn in the sintered slide member exceeds 10% by weight, a hard Cu—Sn—Mn phase is precipitated in the Cu—Sn alloy matrix. However, the hard phase exhibits the effect of enhancing an wear resistance of the matrix under the co-existence of the below-mentioned solid lubricant. On the other hand, for example, when the content of Mn reaches 0.1% by weight, the effect of reinforcing the Cu—Sn alloy matrix as well as the effect of enhancing an wear resistance thereof begin to appear, and further when the content of Mn reaches 0.5% by weight, these effects are remarkably observed. Such effects can be continuously exhibited until the content of Mn reaches up to 35% by weight. However, when the content of Mn is more than 35% by weight, the amount of the hard phase precipitated tends to be too large, so that the resultant slide member tends to be deteriorated in wear resistance even when a large amount of the solid lubricant is used therein. In particular, when the content of Mn is too large, the counterpart member tends to suffer from damaged surface. Therefore, the content of Mn in the sintered slide member is 0.1 to 35% by weight and preferably 0.5 to 20% by weight.

The solid lubricant is contained and dispersed in the Cu—Sn alloy matrix, and serves for enhancing a self-lubricating property of the resultant sintered slide member. As a result of incorporating the solid lubricant in the Cu—Sn alloy matrix, the sintered slide member not only can be further enhanced in load carrying capacity and wear resistance, but also can be used even under dry frictional conditions. Further, in addition to the above solid lubrication effect, the solid lubricant also serves as a retainer for a lubrication oil when used as an oil-containing sintered slide member, thereby further enhancing a load carrying capacity and an wear resistance of the oil-containing sintered slide member. Examples of the solid lubricant usable in the present invention may include natural graphite, synthetic graphite, boron nitride (BN), molybdenum disulfide ($MoS_2$) and mixtures thereof. The content of the solid lubricant in the sintered slide member may be determined depending upon the applications and objects of the sintered slide member as well as the ratio of the hard phase precipitated in the Cu—Sn alloy matrix based on the above Mn content, and is 2 to 25% by weight. When used in the oil-containing sintered slide member, the content of the solid lubricant therein is preferably 2 to 5% by weight, and when used under dry frictional conditions, the content of the solid lubricant in the sintered slide member is preferably 5 to 25% by weight and more preferably 10 to 25% by weight.

Copper (Cu) is a main component of the copper-based sintered slide member, and constitutes the balance of the copper-based sintered slide member excluding Sn, Mn and the solid lubricant therefrom. The content of Cu is a remainder obtained by subtracting the contents of Sn, Mn and the solid lubricant from the whole amount of the copper-based sintered slide member. Meanwhile, the copper-based sintered slide member contains, in addition to Cu, Sn, Mn and solid lubricant, impurities inevitably incorporated during the production of the copper-based sintered slide member. Examples of the inevitable impurities may include P, Fe, Al, Si, etc. The content of the inevitable impurities in the sintered slide member is usually not more than 1.0% by weight.

The multilayer copper-based sintered slide member of the present invention is constructed from a copper-based alloy sintered layer composed of 0.5 to 20% by weight of tin, 0.1 to 35% by weight of manganese, 2 to 25% by weight of a solid lubricant and the balance essentially consisting of copper, and a metal backing plate which are formed into an integral multilayer structure.

The copper-based alloy sintered layer has the same composition as that of the above copper-based sintered slide member. The metal backing plate may be appropriately selected from a cold-rolled steel plate (SPCC: JIS-G-3141), a cold-rolled stainless steel plate (SUS: JIS-G-4305), and copper and copper alloy plates (JIS-H-3100) such as those made of oxygen-free copper, tough pitch copper, brass, aluminum bronze, etc., depending upon applications and objects of the obtained multilayer sintered slide member. Meanwhile, when using the above cold-rolled steel plate as the metal backing plate, the surface of the steel plate may be plated with Cu for the purpose of rust proofing thereof.

Next, examples of the processes for producing the copper-based sintered slide member and the multilayer copper-based sintered slide member of the present invention are described.

First, the process for producing the copper-based sintered slide member (single product) is explained. For example, electrolytic Cu particles having a particle size of usually not more than 75 μm and preferably not more than 45 μm together with 0.5 to 20% by weight of atomized Sn particles having a particle size of usually not more than 75 μm and preferably not more than 45 μm, 0.1 to 35% by weight of Mn particles having a particle size of usually not more than 45 μm and 2 to 25% by weight of solid lubricant particles having a particle size of usually not more than 150 μm and preferably not more than 106 μm are charged into a V-type mixer and mixed therein with each other for a period of usually 20 to 40 min to prepare mixed particles. The thus prepared mixed particles are filled in a mold having a desired shape and subjected therein to compression molding under a pressure of usually 2 to 7 ton/cm² to obtain a green compact. The thus obtained green compact is sintered in a heating furnace controlled under a reducing atmosphere such as ammonia decomposed gas, nitrogen gas, hydrogen gas and a mixed gas of hydrogen and nitrogen or under a non-oxidative atmosphere at a temperature of usually 700 to 900° C. for a period of usually 20 to 60 min. Thereafter, the thus sintered green compact was taken out of the heating furnace and then may be optionally mechanically processed into a desired size, thereby producing the copper-based sintered slide member. The thus produced copper-based sintered slide member is subjected to oil impregnation treatment depending upon applications thereof to produce a copper-based oil-containing sintered slide member.

Next, the process for producing the multilayer copper-based sintered slide member is described. For example, the same method as described above is conducted to prepare mixed particles composed of 0.5 to 20% by weight of Sn, 0.1 to 35% by weight of Mn, 2 to 25% by weight of the solid lubricant and the balance essentially consisting of copper. The thus prepared mixed particles are scattered and spread over a metal (steel) backing plate having a thickness of usually 1 to 2.5 mm which may be previously degreased and cleaned, if required, and then sintered in the heating furnace controlled under the same atmosphere as described above at a temperature of usually 700 to 900° C. for a period of usually 10 to 30 min to form a sintered layer on the steel plate. Next, the resultant product is rolled under a roll pressure such that the thickness of the sintered layer lies within the range of usually 0.2 to 1.0 mm, and then sintered again in the heating furnace at a temperature of usually 700 to 900° C. for a period of usually 10 to 30 min, thereby producing the multilayer copper-based sintered slide member.

Meanwhile, in the processes for producing the sintered slide member (single product) and the multilayer sintered slide member, Cu—Sn alloy particles may be used in place of the Cu particles and the Sn particles in the form of a single substance.

EXAMPLES

The present invention is described in more detail by the following Examples. However, these Examples are only illustrative and not intended to limit the present invention thereto unless they depart from a scope of the present invention.

Example 1

Electrolytic Cu particles having a particle size of not more than 45 μm together with 10% by weight of atomized Sn particles having a particle size of not more than 45 μm, 6% by weight of Mn particles having a particle size of not more than 45 μm and 5% by weight of natural graphite particles having a particle size of not more than 150 μm were charged into a V-type mixer and mixed therein with each other for 20 min to prepare mixed particles. The thus prepared mixed particles were filled in a mold and subjected therein to compression molding under a molding pressure of 2 ton/cm² to obtain a green compact having a flat-plate shape. The thus obtained green compact was sintered in a heating furnace controlled under a hydrogen gas atmosphere at 760° C. for 60 min. Thereafter, the thus sintered green compact was cooled and then mechanically processed to produce a square sintered slide member having a length of each side of 30 mm and a thickness of 5 mm. Next, the thus produced sintered slide member was subjected to oil impregnation treatment to produce an oil-containing sintered slide member.

Examples 2 to 5

The same procedure as defined in Example 1 was conducted except that the composition of the mixed particles were changed as shown in Tables 2 and 3, thereby obtaining oil-containing sintered slide members.

Comparative Example 1

Electrolytic Cu particles having a particle size of not more than 45 μm together with 10% by weight of atomized Sn particles having a particle size of not more than 45 μm and 5% by weight of natural graphite particles having a particle size of not more than 150 μm were charged into a V-type mixer and mixed therein with each other for 20 min to prepare mixed particles. The thus prepared mixed particles were subjected to compression molding, sintering and mechanical processing in the same manner as defined in Example 1, thereby obtaining a square sintered slide member having a length of each side of 30 mm and a thickness of 5 mm. Next, the thus produced sintered slide member was subjected to oil impregnation treatment to produce an oil-containing sintered slide member.

Meanwhile, since a molding pressure and a sintering time of the respective green compacts required for obtaining desired oil contents therein vary depending upon kinds of the solid lubricants or blending ratios of the respective components, the molding pressures and the sintering times respectively used in the above Examples 1 to 5 and Comparative Example 1 are shown in Tables 2 to 3.

The respective oil-containing sintered slide members obtained in Examples 1 to 5 and Comparative Example 1 were subjected to durability test under the conditions shown in Table 1 to examine friction and wear characteristics thereof. The test results are shown in Tables 2 and 3.

TABLE 1

| Load as the surface pressure: | 19.6 MPa (200 kgf/cm²) |
|---|---|
| Sliding speed: | 3 m/min |
| Counterpart member: | carbon steel for mechanical structural use (S45C) |
| Testing time; | 20 hr |

TABLE 2

| | Examples | | | |
|---|---|---|---|---|
| | 1 | 2 | 3 | 4 |
| Composition | | | | |
| Cu (wt %) | 79 | 79 | 79 | 72 |
| Sn (wt %) | 10 | 10 | 10 | 10 |
| Mn (wt %) | 6 | 6 | 6 | 13 |
| Solid lubricant (wt %) | 5 (*1) | 5 (*2) | 5 (*3) | 5 (*1) |
| Molding pressure (ton/cm²) | 2 | 4 | 2 | 2 |
| Sintering time (min) | 60 | 60 | 60 | 60 |
| Oil content (volume %) | 14 | 18 | 18 | 15 |
| Friction coefficient | 0.11 | 0.13 | 0.11 | 0.12 |
| Wear loss (mm) | 0.04 | 0.03 | 0.03 | 0.03 |

Note:
(*1) natural graphite;
(*2) synthetic graphite;
(*3) BN

TABLE 3

| | Example 5 | Comparative Example 1 |
|---|---|---|
| Composition | | |
| Cu (wt %) | 50 | 85 |
| Sn (wt %) | 10 | 10 |
| Mn (wt %) | 35 | — |
| Solid lubricant (wt %) | 5 (*1) | 5 (*1) |
| Molding pressure (ton/cm²) | 4 | 1 |
| Sintering time (min) | 60 | 40 |
| Oil content (volume %) | 20 | 14 |
| Friction coefficient | 0.13 | 0.15 |
| Wear loss (mm) | 0.01 | 0.3 |

Note:
(*1) natural graphite

From the above test results, it was confirmed that the oil-containing sintered slide members obtained in Examples 1 to 5 were small in both friction coefficient and wear loss as compared to those of the oil-containing sintered slide member obtained in Comparative Examples 1, and therefore exhibited excellent friction and wear characteristics. In addition, although precipitation of a Cu—Sn—Mn phase was recognized in a Cu—Sn matrix of each of the sintered slide members obtained in Examples 4 and 5, as a result of observing the surface of the counterpart member, it was confirmed that the counterpart member was free from defects such as damaged surface.

Example 6

Atomized Cu-10 wt % Sn alloy particles having a particle size of not more than 45 μm together with 2.5% by weight of Mn particles having a particle size of not more than 45 μm and 20% by weight of natural graphite particles having a particle size of not more than 150 μm were charged into a V-type mixer and mixed therein with each other for 20 min to prepare mixed particles (Cu: 69.8% by weight; Sn: 7.7% by weight; Mn: 2.5% by weight; graphite: 20% by weight). The thus prepared mixed particles were filled in a mold and subjected therein to compression molding under a molding pressure of 4 ton/cm² to obtain a green compact having a flat-plate shape. The thus obtained green compact was sintered in a heating furnace controlled under a hydrogen gas atmosphere at 760° C. for 60 min. Thereafter, the thus sintered green compact was cooled and then mechanically processed to produce a square sintered slide member having a length of each side of 30 mm and a thickness of 5 mm.

Examples 7 to 11

The same procedure as defined in Example 6 was conducted except that the composition of the mixed particles were changed as shown in Tables 5 and 6, thereby obtaining sintered slide members.

Comparative Example 2

Atomized Cu-10 wt % Sn alloy particles having a particle size of not more than 45 μm were blended with natural graphite particles having a particle size of not more than 150 μm such that the content of graphite therein was 20% by weight. The blended mixture was charged into a V-type mixer and mixed therein for 20 min to prepare mixed particles (Cu: 72.0% by weight; Sn: 8.0% by weight; graphite: 20% by weight). The thus prepared mixed particles were subjected to compression molding, sintering and mechanical processing in the same manner as defined in Example 6, thereby obtaining a square sintered slide member having a length of each side of 30 mm and a thickness of 5 mm.

The respective sintered slide members obtained in Examples 6 to 11 and Comparative Example 2 were subjected to a test under the conditions shown in Table 4 to examine a load carrying capacity thereof. The test results are shown in Tables 5 and 6.

TABLE 4

| | |
|---|---|
| Load as the surface pressure: | Initial load: 2.94 MPa (30 kgf/cm$^2$); Applied in a cumulative manner while increasing a load applied by 2.94 MPa (30 kgf/cm$^2$) at intervals of 20 min. |
| Sliding speed: | 1 m/min |
| Counterpart member: | carbon steel for mechanical structural use (S45C) |
| Lubrication: | non-lubricated |

TABLE 5

| | Examples | | | |
|---|---|---|---|---|
| | 6 | 7 | 8 | 9 |
| Composition | | | | |
| Cu (wt %) | 69.8 | 66.3 | 60.6 | 56.0 |
| Sn (wt %) | 7.7 | 7.4 | 6.7 | 6.2 |
| Mn (wt %) | 2.5 | 6.3 | 12.7 | 17.8 |
| Solid lubricant (wt %) | 20.0 (*1) | 20.0 (*1) | 20.0 (*1) | 20.0 (*1) |
| Critical load as the surface pressure (MPa) | 58.8 | 79.4 | 64.7 | 70.6 |
| Friction coefficient | 0.14 | 0.12 | 0.14 | 0.16 |

Note:
(*1) natural graphite

TABLE 6

| | Example 10 | Example 11 | Comparative Example 2 |
|---|---|---|---|
| Composition | | | |
| Cu (wt %) | 49.0 | 45.0 | 72.0 |
| Sn (wt %) | 5.4 | 5.0 | 8.0 |
| Mn (wt %) | 25.6 | 30.0 | — |
| Solid lubricant (wt %) | 20.0 (*1) | 20.0 (*1) | 20.0 (*1) |
| Critical load as the surface pressure (MPa) | 67.6 | 61.8 | 14.7 |
| Friction coefficient | 0.14 | 0.14 | 0.14 |

Note:
(*1) natural graphite

From the above test results, it was confirmed that the sintered slide members obtained in Examples 6 to 11 exhibited excellent friction characteristics until reaching the critical load (surface pressure) as high as from 58.8 MPa (600 kgf/cm$^2$) to 79.4 MPa (810 kgf/cm$^2$) when measured under dry frictional conditions (non-lubricated) and, therefore, had an excellent load carrying capacity. In addition, although precipitation of a Cu—Sn—Mn phase was recognized in a Cu—Sn matrix of each of the sintered slide members obtained in Examples 8 to 11, as a result of observing the surface of the counterpart member, it was confirmed that the counterpart member was free from defects such as damaged surface.

Example 12

Electrolytic Cu particles having a particle size of not more than 45 μm together with 10% by weight of atomized Sn particles having a particle size of not more than 45 μm, 2.5% by weight of Mn particles having a particle size of not more than 45 μm and 15% by weight of natural graphite particles having a particle size of not more than 150 μm were charged into a V-type mixer and mixed therein with each other for 20 min to prepare mixed particles. The thus prepared particles were scattered and spread over a metal backing plate (cold-rolled steel plate: SPCC) having a thickness of 1.7 mm, and then sintered in a heating furnace controlled under a nitrogen/hydrogen mixed gas atmosphere, at 780° C. for 20 min to integrally form a sintered layer composed of the mixed particles on the steel plate. Next, the resultant sintered plate is rolled such that the thickness of the sintered layer was 0.3 mm, and then sintered in the heating furnace at 780° C. for 20 min. The thus sintered plate was cooled and then mechanically processed to produce a square multilayer copper-based sintered slide member having a length of each side of 30 mm and a thickness of 2 mm.

Examples 13 to 15

The same procedure as defined in Example 12 was conducted except that the composition of the mixed particles was changed as shown in Table 8, thereby obtaining sintered slide members.

Comparative Example 3

Electrolytic Cu particles having a particle size of not more than 45 μm together with 10% by weight of atomized Sn alloy particles having a particle size of not more than 45 μm, 10% by weight of stamped lead (Pb) having an average particle size of 75 μm and 3% by weight of natural graphite particles having a particle size of not more than 150 μm were charged into a V-type mixer and mixed therein with each other for 20 min to prepare mixed particles. The thus prepared mixed particles were subjected to sintering and mechanical processing in the same manner as defined in Example 12, thereby obtaining a square multilayer sintered slide member having a length of each side of 30 mm and a thickness of 2 mm.

The respective sintered slide members obtained in Examples 12 to 15 and Comparative Example 3 were subjected to durability test under the conditions shown in Table 7 to examine friction and wear characteristics thereof. The test results are shown in Table 8.

TABLE 7

| | |
|---|---|
| Load as the surface pressure: | (1) 19.6 MPa (200 kgf/cm$^2$); and (2) 29.4 MPa (300 kgf/cm$^2$) |
| Sliding speed: | 1 m/min |
| Counterpart member: | carbon steel for mechanical structural use (S45C) |
| Testing time: | 20 hr |
| Lubrication: | non-lubricated |

TABLE 8

| | Examples | | |
|---|---|---|---|
| | 12 | 13 | 14 |
| Composition | | | |
| Cu (wt %) | 72.5 | 68.7 | 62.3 |
| Sn (wt %) | 10 | 10 | 10 |
| Mn (wt %) | 2.5 | 6.3 | 12.7 |
| Solid lubricant (wt %) | 15 (*1) | 15 (*1) | 15 (*1) |
| Pb (wt %) | — | — | — |
| Surface pressure (1) | | | |
| Friction coefficient | 0.14 | 0.12 | 0.14 |
| Wear loss (mm) | 0.05 | 0.03 | 0.04 |
| Surface pressure (2) | | | |
| Friction coefficient | 0.15 | 0.12 | 0.15 |
| Wear loss (mm) | 0.07 | 0.04 | 0.06 |

| | Example 15 | Comparative Example 3 |
|---|---|---|
| Composition | | |
| Cu (wt %) | 49.4 | 77 |
| Sn (wt %) | 10 | 10 |
| Mn (wt %) | 25.6 | — |
| Solid lubricant (wt %) | 15 (*1) | 3 (*1) |
| Pb (wt %) | — | 10 |
| Surface pressure (1) | | |
| Friction coefficient | 0.16 | 0.16 |
| Wear loss (mm) | 0.04 | 0.05 |
| Surface pressure (2) | | |
| Friction coefficient | 0.15 | 0.31 |
| Wear loss (mm) | 0.06 | ** |

Note:
(*1): natural graphite

From the above test results, it was confirmed that the multilayer sintered slide members obtained in Examples 12 to 15 exhibited excellent friction and wear characteristics similar to those of the multilayer sintered slide member obtained in Comparative Example 3 when measured under a load (surface pressure) of 19.6 MPa, and were also excellent in friction and wear characteristics even without using Pb as the solid lubricant when measured under a load (surface pressure) of 29.4 MPa. Meanwhile, the mark "**" in Table 8 indicates that the wear loss of the slide member obtained in Comparative Example 3 was not measurable because it failed to withstand the applied load (surface pressure) of 29.4 MPa over the whole testing time. In addition, although precipitation of a Cu—Sn—Mn phase was recognized in a Cu—Sn matrix of each of the sintered slide members obtained in Examples 14 and 15, as a result of observing the surface of the counterpart member, it was confirmed that the counterpart member was free from defects such as damaged surface.

The invention claimed is:

1. A copper-based sintered slide member consisting of 0.5 to 20% by weight of tin, 0.1 to 35% by weight of manganese, 2 to 25% by weight of a solid lubricant, and the balance of copper.

2. The copper-based sintered slide member of claim 1, wherein the solid lubricant is selected from the group consisting of natural graphite, boron nitride (BN), molybdenum sulfide ($MoS_2$) and mixtures thereof.

3. The copper-based sintered slide member of claim 2, wherein the solid lubricant is natural graphite or synthetic graphite.

4. A multilayer copper-based sintered slide member comprising a copper-based alloy sintered layer and a metal backing plate which are formed into an integral multilayer structure, wherein the copper-based alloy sintered layer consists of 0.5 to 20% by weight of tin, 0.1 to 35% by weight of manganese, 2 to 25% by weight of a solid lubricant, and the balance of copper.

5. The multilayer copper-based sintered slide member of claim 4, wherein the solid lubricant is selected from the group consisting of natural graphite, boron nitride (BN), molybdenum sulfide ($MoS_2$) and mixtures thereof.

6. The multilayer copper-based sintered slide member of claim 5, wherein the solid lubricant is selected from the group consisting of natural graphite, boron nitride (BN), molybdenum sulfide ($MoS_2$) and mixtures thereof.

* * * * *